(12) United States Patent
Kinjo

(10) Patent No.: US 7,542,070 B2
(45) Date of Patent: Jun. 2, 2009

(54) IMAGE PROCESSING APPARATUS, AND PHOTOGRAPHING SYSTEM FOR RECEIVING AND CREATING PROCESSING INFORMATION

(75) Inventor: Naoto Kinjo, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 500 days.

(21) Appl. No.: 09/760,647

(22) Filed: Jan. 17, 2001

(65) Prior Publication Data

US 2001/0008417 A1 Jul. 19, 2001

(30) Foreign Application Priority Data

Jan. 17, 2000 (JP) ............... 2000-007510

(51) Int. Cl.
*H04N 7/00* (2006.01)
*H04N 5/225* (2006.01)

(52) U.S. Cl. .............. 348/116; 348/207.1; 348/552

(58) Field of Classification Search ............ 348/207.99, 348/207.1, 207.11, 211.1, 211.2, 552, 211.3; 740/270

See application file for complete search history.

(56) References Cited

U.S. PATENT DOCUMENTS

| | | | | |
|---|---|---|---|---|
| 5,737,491 A * | 4/1998 | Allen et al. ............... | 704/270 |
| 6,006,039 A * | 12/1999 | Steinberg et al. ............ | 396/57 |
| 6,198,542 B1 * | 3/2001 | Tabata ....................... | 358/1.15 |
| 6,222,583 B1 * | 4/2001 | Matsumura et al. ......... | 348/113 |
| 6,507,371 B1 * | 1/2003 | Hashimoto et al. .......... | 348/552 |
| 6,535,243 B1 * | 3/2003 | Tullis ....................... | 348/207.1 |
| 6,657,658 B2 * | 12/2003 | Takemura ............... | 348/207.99 |
| 7,170,632 B1 * | 1/2007 | Kinjo ........................ | 358/1.9 |
| 2001/0019420 A1 | 9/2001 | Sanbongi et al. | |
| 2003/0133019 A1 | 7/2003 | Higurashi et al. | |

FOREIGN PATENT DOCUMENTS

| | | | |
|---|---|---|---|
| JP | 7-129752 A | 5/1995 |
| JP | 10-187929 A | 7/1998 |
| JP | 10243263 | 9/1998 |
| JP | 11-88672 | * 3/1999 |
| JP | 11355642 | 12/1999 |

OTHER PUBLICATIONS

Foreign Office Action dated Nov. 7, 2006.

* cited by examiner

*Primary Examiner*—Thai Tran
*Assistant Examiner*—Heather R Jones
(74) *Attorney, Agent, or Firm*—Sughrue Mion, PLLC

(57) ABSTRACT

The image processing method and apparatus receive at least one of photographed image data, temporary camera control information, additional information and indication information of a desired processing content from the camera and reason out or create at least one information of information relating to photographing control, information relating to image processing and information relating to a photographed image, in accordance with the at least one which have been received and preferably supply the at least one information reasoned out or created to the camera. The camera includes an image sensor, an input unit and an information sending/receiving unit. The photographing system includes the camera and the image processing apparatus.

8 Claims, 2 Drawing Sheets

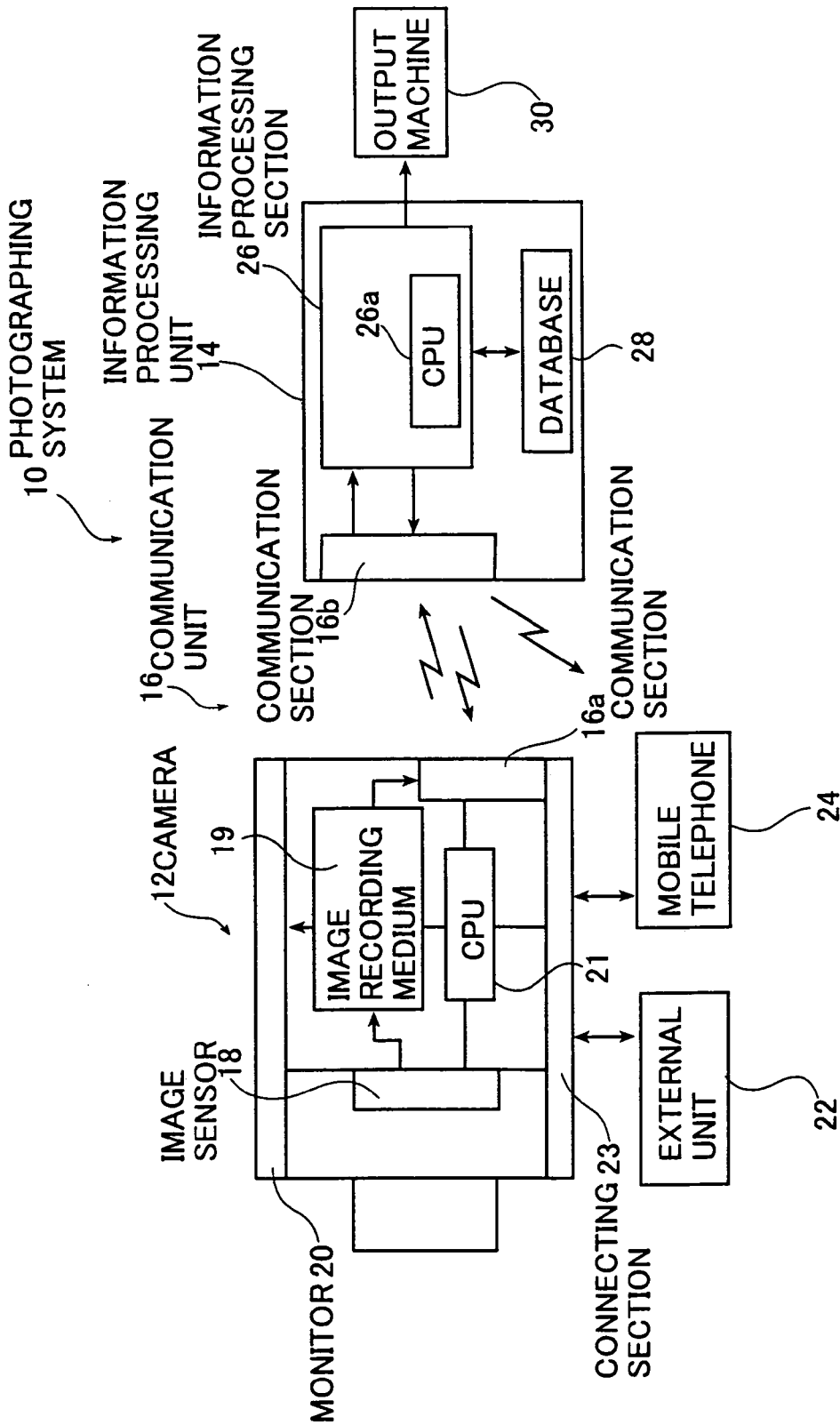

IMAGE PROCESSING APPARATUS, AND PHOTOGRAPHING SYSTEM FOR RECEIVING AND CREATING PROCESSING INFORMATION

BACKGROUND OF THE INVENTION

The present invention relates to the technical fields of an image processing method, an image processing apparatus, a camera and a photographing system which are adopted when a subject is photographed using various types of cameras such as a digital camera and the like, and more particularly, to an image processing method, an image processing apparatus, a camera and a photographing system capable of greatly improving the capability and function of a camera.

The capability of cameras are improved over the years, and it goes without saying that cameras are provided with an AF (auto focus) function for performing automatic focusing when an image is photographed and an AE (auto exposure) function for automatically adjusting exposure.

Many types of cameras are available which have a plurality of exposure programs (combinations of shutter speeds and aperture values) and in which a user can select an appropriate exposure program or which can select it automatically in accordance with a photographing environment or situation and a subject to the photographed target (the subject and the state of the subject) his or her preference and the like.

Further, there are many types of cameras which store exposure programs and the like in an accessory such as an IC or the like and permits a user to appropriately download an exposure program in accordance with his or her preference and the like.

As described above, while the capability of cameras has been greatly enhanced recently, the processing capability of a CPU mounted on the camera, that is, the processing which can be carried out by the cameras is limited. Accordingly, more complex processing such as processing which is carried out in accordance with a user's desire cannot be performed.

SUMMARY OF THE INVENTION

Accordingly, an object of the present invention is to provide an image processing method, an image processing apparatus, a camera and a photographing system capable of greatly improving the function of a camera as well as the capability thereof and performing various types of processing steps of not only conventional auto focusing and auto exposure but also camera control of high order in accordance with a subject and a photographing scene, image composition, image correction, and the like.

In order to attain the above object, the present invention provides an image processing method comprising the steps of:

receiving at least one of photographed image data, temporary camera control information, additional information and indication information of a desired processing content from a camera; and reasoning out or creating at least one information of information relating to photographing control, information relating to image processing and information relating to a photographed image, in accordance with said at least one of said photographed image data, said temporary camera control information, said additional information and said indication information which have been received.

Preferably, said information relating to the photographed image is information related to a subject or a photographing condition.

Preferably, said at least one information reasoned out or created is supplied to said camera.

Preferably, the step of receiving said at least one of said photographed image data, said temporary camera control information, said additional information and said indication information from said camera and the step of supplying said at least one information to said camera are performed by wired or radio communications.

Preferably, said information relating to the photographed image is principal subject information reasoned out or created in accordance with said photographed image data, said information relating to the photographing control is at least one of camera control information set in accordance with said principal subject information and camera position information reasoned out or created in accordance with said photographed image data and photographing place information as said additional information, and at least one of said principal subject information, said camera control information and said camera position information is supplied to said camera.

Preferably, said additional information is at least one of information relating to deterioration of marginal lumination of said camera, information relating to poor focus of said camera, information relating to gradation control of density or color of an image, information relating to sharpness enhancement processing or smoothing processing of the image, information relating to geometrical adjustment of the image and information relating to designation of an applicable area of these image processing, and said information relating to the image processing is reasoned out or created in accordance with said additional information received from said camera.

Preferably said additional information is at least one of information related to an image to be composited in an output image and information related to a character to be composited in said output image, at least one of information related to a composite image and information related to a composite character is reasoned out or created in accordance with said additional information received from said camera, and at least one of the information related to said composite image and the information related to said composite character which have been reasoned out or created is supplied to said camera. Preferably, this output image is either one of an output image for a print, an output image for recording/reproduction for image data recording media and an output image for network delivery. Further, it goes without saying that information related to the image to be composited in the output image and the information related to the character to be composited in the output image which are imparted as additional information are not limited to the image and the character, but an audio data is permissible. Furthermore, the same applies to information related to the composite image and information related to the composite character.

The present invention also provides an image processing apparatus comprising;

a receiving/supplying unit which receives at least one of photographed image data, temporary camera control information, additional information and indication information of a desired processing content from a camera having an image sensor and capable of obtaining the photographed image data; and an information processing unit which reasons out or creates at least one information of information relating to photographing control, information relating to image processing and information relating to a photographed image in accordance with said at least one of said photographed image data, said temporary camera control information, said additional information and said indication information.

Preferably, said information processing unit supplies said at least one information reasoned out or created to said camera by said receiving/supplying unit in accordance with processing to be performed.

Preferably, said receiving/supplying unit is an information communication unit.

Preferably, said information relating to the photographed image is principal subject information reasoned out or created in accordance with said photographed image data, said information relating to the photographing control is at least one of camera control information set in accordance with said principal subject information and camera position information reasoned out or created in accordance with said photographed image data and photographed place information as said additional information, and said information processing unit supplies at least one of said principal subject information, said camera control information and said camera position information which have been reasoned out or created to said camera by said receiving/supplying unit.

Preferably, said additional information is at least one of information relating to deterioration of marginal lumination of said camera, information relating to poor focus of said camera, information relating to gradation control of density or color of an image, information relating to sharpness enhancement processing or smoothing processing of the image, information relating to geometrical adjustment of the image and information relating to designation of an applicable area of these image processing, and said information processing unit reasons out or creates said information relating to the image processing in accordance with said additional information which has been received.

Preferably, said additional information is at least one of information related to an image to be composited in an output image and information related to a character to be composited in said output image, and said information processing unit reasons out or creates at least one of information related to a composite image and information related to a composite character in accordance with said additional information which has been received and supplies at least one of the information related to said composite image and the information related to said composite character which have been reasoned out or created to said camera.

Preferably, this output image is either one of an output image for a print, an output image for recording/reproduction for image data recording media and an output image for network delivery. Further, it goes without saying that information related to the image to be composited in the output image and the information related to the character to be composited in the output image which are imparted as additional information are not limited to the image and the character, but an audio data is permissible. Furthermore, the same applies to information related to the composite image and information related to the composite character.

The present invention also provides a camera comprising:
an image sensor for obtaining photographed image data;
an input unit for inputting at least one of additional information and indication information of a desired processing content; and
an information sending/receiving unit for sending at least one of said photographed image data which has been obtained, temporary camera control information which has temporarily been set, said additional information which has been inputted and said indication information which has been inputted to an image processing apparatus, as well as, receives at least one information of information relating to photographing control, information relating to image processing and information relating to photographed image which have been reasoned out or created by said image processing apparatus in accordance with said at least one of said photographed image data, said temporary camera control information, said additional information and said indication information, from said image processing apparatus.

The present invention also provides a photographing system comprising:
a camera; and
an image processing apparatus; wherein
said camera comprises:
an image sensor for obtaining photographed image data;
an input unit for inputting at least one of additional information and indication information of a desired processing content; and
an information sending/receiving unit for sending at least one of said photographed image data which has been obtained, temporary camera control information which has temporarily been set, said additional information which has been inputted and said indication information which has been inputted to said image processing apparatus, as well as, receives at least one information of information relating to photographing control, information relating to image processing and information relating to a photographed image which have been reasoned out or created by said image processing apparatus in accordance with said at least one of said photographed image data, said temporary camera control information, said additional information and said indication information, from said image processing apparatus; and wherein
said image processing apparatus comprises:
a receiving/supplying unit which receives said at least one of said photographed image data, said temporary camera control information, said additional information and said indication information from said camera; and
an information processing unit which reasons out or creates said at least one information of the information relating to said photographing control, the information relating to said image processing and the information relating to said photographed image in accordance with said at least one of said photographed image data, said temporary camera control information, said additional information and said indication information.

Further, the present invention provides a camera control method, comprising the steps of:
transferring at least one of photographed image data, temporary camera control information, additional information and indication information of a desired processing content from a camera to an information processing apparatus;
reasoning out or creating in this information processing apparatus at least one of information related to photographing control, information related to image processing and information related to photographed image as processing data in accordance with at least one of the photographed image data, the temporary camera control information, the additional information and the indication information which have been transferred; and
transferring the reasoned out or created processing data from the information processing apparatus back to the camera;
utilizing in the camera the processing data for photographing control of the camera or data reproduction processing of the photographed image.

Further, the present invention provides an image outputting method, comprising the steps of:
transferring at least one of photographed image data, temporary camera control information, additional information and indication information of a desired processing content from a camera to an information processing apparatus;

reasoning out or creating in the information processing apparatus at least one of information related to photographing control, information related to image processing and information related to photographed image as processing data in accordance with at least one of the photographed image data, the temporary camera control information, the additional information and the indication information which have been transferred; and utilizing the reasoned out or created processing data in at least one of output processing for print, output processing for image data recording media and output processing for network delivery.

Preferably, the photographed image data is image data of the photographed image or a compressed image thereof.

Preferably, the processing data is data of processing result derived from execution of specified image processing.

Preferably, the additional information is constituted of at least one of still image data, animation data, audio data, text data, manuscript data, principal subject area data, camera control data, photographing position data, subject-related data, as well as indication information of conversion processing content thereof.

Preferably, the processing data is constituted of at least one of still image data, animation data, audio data, text data, manuscript data, manipulating key data, position data (map data is permissible), date data and time data as an output result of the specified image processing.

Preferably, the information processing apparatus is a portable external apparatus which is directly connectable to the camera or an installation-type apparatus which can communicate with the camera.

Preferably, the installation-type apparatus is installed in a lab shop.

Preferably, the camera is connected with one or more types of the portable external apparatus and one or more types of the installation-type apparatus whereupon an order of priority is preliminarily set among one or more types of the external apparatus and one or more types of the installation-type apparatus which are connected to the camera and an apparatus to be requested for image processing is changed in accordance with capability of executing a specified image processing content.

BRIEF DESCRIPTION OF THE DRAWINGS

FIG. 1 is a conceptual view of an embodiment of a photographing system of the present invention.

DETAILED DESCRIPTION OF THE INVENTION

Figure 2A:
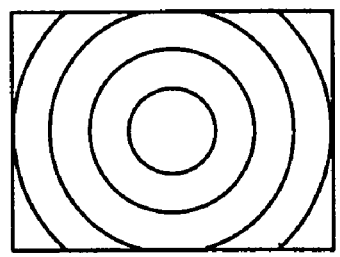
FIGS. 2A, 2B, 2C and 2D are conceptual views explaining an example of processing for executing the photographing system of the present invention.

An image processing method, an image processing apparatus, a camera and a photographing system of the present invention will be described below in detail based on preferred embodiments shown in the accompanying drawings.

FIG. 1 shows a conceptual view of an embodiment of the photographing system of the present invention.

The photographing system 10 shown in FIG. 1 basically comprises a camera 12 according to the present invention, an information processing unit 14 which is an image processing apparatus according to the present invention for performing the image processing method according to the present invention, and a communication unit 16 comprising a communication section 16a in the side of the camera and a communication section 16b in the side of the unit for connecting the camera 12 to the information processing unit 14 via wired or radio system.

In the photographing system 10 of the present invention, the camera 12 includes an image sensor 18 such as a CCD sensor or the like, an image recording medium 19 for storing the image and the like photographed (photoelectrically read) by the image sensor 18 as photographed image data, a monitor 20 for displaying the photographed image and the like, a CPU 21 for performing a control of the camera as a whole and the communication section 16a in the side of the camera.

Various types of cameras can be used in the present invention so long as they have an image sensor 18 such as a CCD and the like, use the image data recording medium such as a smart medium, a memory stick, a floppy disk (FED) and the like as the image recording medium 19 and record photographed image data thereon. Exemplified as the cameras are a digital still camera and a digital video camera. Further, so long as the camera has the image sensor 18 and the monitor 20 that function as a finder and the like and is capable of obtaining the photographed image data by the image sensor 18, the camera which uses a photographic film as the image recording medium 19 and photographs the image thereon may be used in the present invention. In the case of such an optical camera of conventional type, the photographed image obtained by the image sensor 18 is used for automatic setting of camera control information including that of a shutter speed and an aperture value (AE:autoexposure) and that of a photographing magnification and a photographing distance (AF:autofocus), and confirmation of the image to be photographed.

In the illustrated photographing system 10, it is preferable that the camera 12 is provided with a connecting section 23 and can be connected to a PDA (personal digital assistant as a portable information terminal), to an external unit 22 such as a personal computer or the like and to a mobile telephone 24 and the like such as a handy phone in the cellular communication system and the personal handyphone system and the like.

The information processing unit 14 is installed in a photolab, a photo service center and the like and, as shown in FIG. 1, comprises an information processing section 26 having CPU 26a, a database 28, and the communication section 16b in the side of the unit. Such information processing unit 14 may be composed of, for example, a personal computer, the database and the like.

While described later, the information processing unit 14 creates or calculates, in the information processing section 26, information relating to photographing control (hereinunder referred to as "photographing control-related information") such as camera control information and the like, and information relating to the photographed image (hereinunder referred to as "photographed image-related information") such as camera position information and the like using various types of information such as photographed image data, temporary camera control information, additional information and indication information of a desired processing content transferred (sent) from the camera 12 to the communication section 16b and then transfers (resends) the resultant information from the communication section 16b to the camera 12, and calculates (reasons out or elicits) information relating to image processing (hereinunder referred to as "image processing-related information") and the like such as an image processing condition for producing a print, recording and reproducing on an image data recording medium, or delivering through a network. It goes without saying that the image processing-related information calculated in the information processing unit 14 may be transferred (resent) from the communication section 16b to the camera 12.

Further, the information processing unit 14 may create processed image data by subjecting the photographed image data to image processing by using the image processing-related information such as the thus obtained image processing condition and the like and transfer the thus created data to the camera 12 or supply it, together with the image processing-related information such as the image processing condition and the like, to an output machine 30 such as a digital photoprinter which executes print outputting to produce an output image.

Furthermore, the output machine 30 may be the digital photoprinter which outputs an output image as a print, a medium driver that records and/or reproduces the output image (processed image data) in various types of image data recording media such as MO, FD and the like and/or a unit which executes a net transfer service (delivery and/or reproduction) via a communication network such as internet and the like. We describe below a typical case in which the output image is mainly obtained as a print, but the output image may of course be obtained as the one for use in recording and/or reproducing on an image data recording medium, or the one for use in delivering through a network.

The camera 12 is connected to the information processing unit 14 through the communication unit 16 comprising the communication section 16a in the side of the camera and the communication section 16b in the side of the unit so that information is transferred therebetween.

The communication unit 16 may be a known information communication unit utilizing a public communication network or a communication unit utilizing a dedicated communication network, such as internet, a computer communication network, a communication unit making use of a telephone line, a communication unit making use of radio communication and the like. The communication unit 16 may utilize a cable transmission system, a radio communication system or both of them.

Moreover, the communication unit 16a in the side of the camera is necessary to be at least a transmitting unit while the communication unit 16b in the side of the unit is necessary to be at least a receiving unit. Preferably, each of them is a bidirectional communication unit (transmitting/receiving unit) capable of transmitting and receiving bidirectionally.

According to the present invention, various types of information such as the photographed image data, the temporary camera control information, the additional information and the indication information transferred from the camera 12 to the information processing unit 14 as well as the photographing control-related information, the photographed image-related information and the image processing-related information derived from or created in the information processing unit 14 and then transferred to the camera 12 can be explained as follows:

First, the photographed image data that is image data of a photographed image obtained by photographing a subject with the camera 12 and preferably digital image data.

The temporary camera control information is camera control information for controlling the camera 12 for the photographing magnification (photographing distance), shutter speed and aperture and is temporarily set on the side of the camera 12 prior to actual photographing and then transferred to the information processing unit 14. The temporary camera control information also include various types of camera control information temporarily set, for example, when automatic focusing is locked for confirming, modifying or determining the composition in normal photographing.

The additional information is at least one of data such as clock data and position data other than the photographing control data automatically produced within the camera 12, input data from an external connecting unit such as an external unit 22 or the mobile telephole 24 to the camera 12, and input data which a photographer inputs to the camera 12.

The indication information is data for selecting or instructing image processing content that the photographer desires.

The photographing control-related information is at least one of camera control information such as the AE, AF, photographing magnification, and the like of the camera 12, photographing auxiliary infomration in manual photographing (which may include the camera control information) and data on the photographing position and photographing direction.

The image processing-related information is at least one of an image processing condition (for example processing content and setting parameters) for image processing to be executed on the side of the camera 12, an image returned to the side of the camera 12 per se or an image processing condition to be applied thereto and an image to be output (output image as a print or for recording/reproducing on an image data recording medium, or delivering through a network) per se or an image processing condition therefor.

The photographed image-related information is at least one of data on a subject such as photographing result of the subject, data on the area within a picture frame and subject-related data) and data on the photographing condition including various types of data such as photographer, photographing position, photographing date-and-time and data relating thereto.

The photographing system 10 of the present invention arranged as described above can perform various types of high functional processing with pinpoint accuracy which cannot be performed by a conventional camera system.

As an example, auto focus (AF) and auto exposure adjustment (AE), which exceed the capability of a camera as a discrete device (namely, camera control capability of CPU 21 of the camera), can be carried out using an image photographed by the image sensor 18 of the camera 12.

In the processing, prior to photographing an image used to create a print, an image (image data) photographed by the image sensor 18 is transferred to the information processing unit 14 through the communication unit 16. Note that it is preferable to transfer the image data as encoded and compressed data or as thinned-out data from the view point of a transfer time, a communication cost and the like (which is also applicable to the information communication in the respective examples shown below similarly).

The information processing unit 14 extracts a principal subject from the image by means of a known method such as the extraction by continuity of pixel, shape recognition, and the cutting out of the main body by an operator making use a GUI (graphical user interface) in the information processing section 26 and transfers the information of the principal subject serving as photographing control information to the camera 12 through the communication unit 16.

The camera 12 photographs the image to be used for the print by performing AF, AE, white balance adjustment and the like making use of the principal subject information transferred thereto. Otherwise, the AF, AE and the like that are controlled in the camera 12 may be set in the information processing unit 14 and transferred to the camera 12 as camera control information.

That is, according to the embodiment, the highly accurate AF, AE and the like that exceed the capability of the camera can be carried out making use of the information or the principal subject.

In the above processing, after the image for creating the print is photographed, the photographed image may be sent to the information processing unit 14 and subjected to image processing therein, and the processed image may be retransferred (resent) to the camera 12 to permit a user to confirm the image on the monitor 20 of the camera 12 (that is, the user may verify the processed image by means of the monitor 20).

With this confirmation, it is possible for the user to instruct the color and density adjustment that the user desires to a photo-lab when he or she requests the creation of a print thereto. Otherwise, when the user desires to adjust color and density in the confirmation of the image on the monitor 20, he or she may change image processing conditions by transmitting the information of the color and density to the information processing unit 14.

In the above processing, when a plurality of principal subjects are extracted, priorities may be assigned to the extracted principal subjects.

In this case, the user may confirm the principal subjects that are sequentially displayed on the monitor 20 together with, for example, frames or the like for designating them in accordance with the priorities thereof in response to the user's request, and when a proper principal subject is displayed on the monitor 20, the user may instruct to use it as a final principal subject, and the AF, AE and the like may be carried out in accordance with the final principal subject.

In the creation of the camera control information, a multistage-focused image may be utilized when a video camera is used as the camera 12 (when a moving image is photographed).

First, a plurality of images the focused positions of which are changed, that is, multistage-focused images are photographed in a state in which a subject is less moved and transferred to the information processing unit 14 through the communication unit 16.

The information processing unit 14 calculates the camera to subject information of respective pixels using the multistage-focused images transferred thereto, extracts a principal subject using the camera to subject information, and transfers the information of the principal subject to the camera 12. Note that a method of extracting the camera to subject information of the respective pixels from the multistage-focused images is described in detail in "Integration of Multiple Images" (Journal of the Institute of Electronics, Information and Communication Engineers, vol. 179, pp 490-499). Further, a method of extracting a principal subject from the information of respective pixels is described in Japanese Unexamined Patent Application Publication No. 5-127270 filed by the applicant.

The camera 12 divides an image into small blocks and traces the movement of the principal subject in the unit of each block using the information of the principal subject transferred thereto and performs AF and AF using the information of the movement of the principal subject. Further, when an image is reproduced, a principal subject area and a background area may be independently subjected to luminance adjustment because the principal subject is extracted.

The highly accurate AF, AE and the like that exceed the capability of a camera can be carried out also in the embodiment making use of the information of the principal subject and the movement information thereof.

It is preferable that the multistage-focused images be photographed by the camera 12 and transferred to the information processing unit 14 each time a different scene is photographed by the camera 12.

Further, it is needless to say that even if a moving image is photographed by a digital video camera, AF and AE are carried out by extracting a principal subject from one image (image of one frame) similarly to the above example.

As another embodiment, various types of image correction may be carried out based on an instruction using the camera 12 according to the photographing system of the present invention, For example, the deterioration of marginal lumination that is caused by the capability of the lens, and the like of the camera 12 can be corrected as described below.

At the time, a display on the monitor 20 of the camera 12 is divided into areas shown by concentric circles about the optical axis of the lens of the camera 12 by the selection of modes and the like as shown in FIG. 2A.

In the mode, the image of a subject, for example, a wall having a uniform density (the image hereinafter referred to as "wall image"), is photographed by the image sensor 18 and displayed on the monitor 20. Then, the user adjusts the density of each area by means of the GUI and the external unit 22 that use the display on the monitor 20 while observing the monitor 20 so that the density (luminance) of the overall image is made uniform and stores the adjustment parameters (for example, amounts of adjustment of the respective areas) in the memory of the camera 12 or the like as quantity of peripheral light correcting information that is intrinsic to the camera 12.

An image is photographed by the camera 12 after the adjustment parameters are set, and the photographed image and the adjustment parameters (marginal lumination correcting information) are transferred as one set to the information processing unit 14 through the communication unit 16.

Further, the wall image (data) photographed by the camera 12 may be transferred to the information processing unit 14, where marginal rumination correcting information may be calculated.

The information processing unit 14 adjusts the densities of the respective areas of the images of all the frames that have been photographed by the camera 12 and transferred thereto in accordance with the adjustment parameters transferred thereto and then supplies the images the irregular densities of which caused by the deterioration of the marginal lumination of the camera 12 are corrected to a printer or the like.

When necessary, the user may confirm a result of correction of the corrected images by transferring them from the information processing unit 14 to the camera 12 through the communication unit 16 and displaying them on the monitor 20.

In the embodiment, the sharpness enhancement or smoothing processing of the images may be corrected by the information processing unit 14 by setting intensities to respective areas, in addition to the correction of the deterioration of the marginal lumination.

Further, the adjustments of the density (luminance) and the sharpness emphasis are not limited to uniformly adjust an overall image, and, for example, a certain region of the image may be intentionally emphasized. Note that, in this case, adjustment parameters and an image (frame) to be adjusted are sent to the information processing unit 14 in correspondence to each other.

Further, the user may divide an image to any arbitrary areas.

According to the photographing system of the present invention, various types of geometrical adjustments (corrections) also can be carried out to an image by the following methods.

Figure 2B:
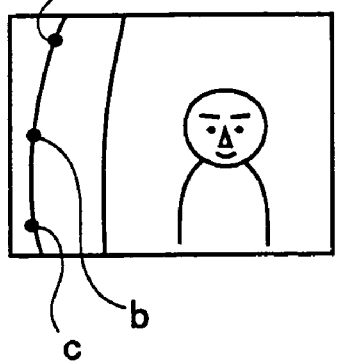

For example, as a method of correcting a curved image (geometrical distortion of an image) caused by the aberration of the lens of the camera 12, and the like, an image photographed by the camera 12 is displayed on the monitor 20, and when a portion that must be apparently straight (for example, a building, a utility pole, and the like) is distorted, the user points out the distorted portion at three points (points a, b, and c) as shown in FIG. 2B and stores them as adjustment parameters (distortion correcting information) that is inherent to the camera 12 in the same way.

After the adjustment parameters are set, the image photographed by the camera 12 and the adjustment parameters are transferred to the information processing unit 14 as one set through the communication unit 16. The information processing unit 14 calculates geometrical distortion correcting parameters for all the symmetrical portions of the image using the adjustment parameters (distortion correcting information) and corrects the geometrical distortions of the images of all the frames transferred thereto using the geometrical distortion correcting parameters.

Further, when necessary, the user may confirm a result of correction of the corrected images by transferring the corrected images to the camera 12 through the communication unit 16 and displaying them on the monitor 20.

Adjustment parameters that intentionally distort an image may be set also in the image correction (image adjustment).

Figure 2C:
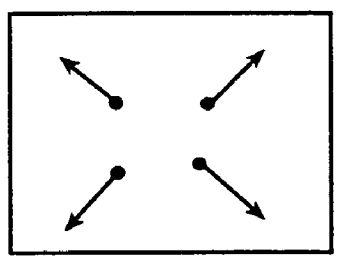

For example, a photographed image may be displayed on the monitor 20 of the camera 12, arrows, which instruct to distort the image from arbitrary points thereof as starting points to end points may be set on the monitor 20 by the GUI or the like as shown in FIG. 2C, and the arrows as adjustment parameters may be transferred to the information processing unit 14 in combination with the image so as to intentionally distort the image.

Figure 2D:
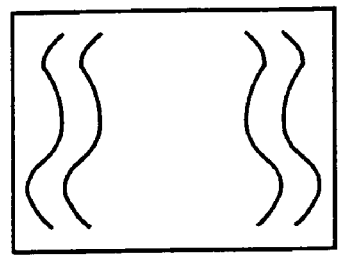

Further, similar processing may be carried out by presetting distortion patterns as shown in FIG. 2D and by transferring them as adjustment parameters to the information processing unit 14 in combination with an image to be distorted.

Note that the adjustment parameters and an image to be processed are sent to the information processing unit 14 in correspondence to each other also in the above examples.

As apparent from the above description, according to these embodiments, a degree of correction of an irregular density of an image caused by the deterioration of the marginal lumination, intensity of sharpness emphasis processing performed in each area and a degree of correction of geometrical distortion of an image caused by the aberration of a lens can be set and adjusted in accordance with the preference of the user.

Further, an image, which is processed so as to be provided with intentional differences of a density, a degree of sharpness and distortion can be created by arbitrarily changing a degree of adjustment, which can improve the amusement property of a print.

Furthermore, it may be arranged such that gradation adjustment for each of densities or colors may manually be performed. Moreover, it may also be arranged that an area subjectable to the above-described various types of image processing can arbitrarily be designated.

In the image correction as described above, the adjustment parameters and the image data need not be necessarily supplied to the information processing unit 14 and the like through the communication unit 16, and they may be stored in, for example, a storing medium such as a smart medium or the like as an image file including both the adjustment parameters and the image data and the storing medium may be supplied to the information processing unit 14 of a photo-lab or the like.

Processing such as the correction of marginal lumination, the correction of geometrical correction and the like need not necessarily be carried out by the information processing unit 14 and may be carried out by an image information processing unit provided with a printer of the photo-lab.

Further, when necessary, various types of adjustment parameters may be stored in the information processing unit 14 or in an image information processing unit or the like of the photo-lab as the adjustment parameters inherent to the camera 12 in correspondence therewith, and when the images of the same camera 12 are supplied thereto thereafter, the images may be adjusted (corrected) using the parameters.

As a different embodiment, according to the photographing system of the present invention, an arbitrary image and an arbitrary character can be easily combined with an image photographed by the camera 12 (hereinafter, referred to as "photographed image") in response to an instruction using the camera 12.

In the embodiment, the camera 12 is provided with a function for inputting various type of data such as a photographed image, voice, an image (data) written by a hand, and the like through a keyboard and buttons as well as with an image combining position designating function by the GUT or the like that uses the monitor 20. The data input function may be composed of a known unit using the external unit 22, the mobile telephone 24 and the like.

The user of the camera 12 inputs data corresponding to an image and a character (hereinafter, referred to as "image to be combined") that are to be combined with a photographed image to the camera 12 using the data input function as well as inputs converting pattern indication information (that will be described later in detail) to the camera 12 and transfers them to the information processing unit 14 through the communication unit 16.

The information processing unit 14 converts the input data in accordance with the converting pattern indication information and arranges it as the image data of the image to be combined and transfers the image data to the camera 12 of the user through the communication unit 16.

The camera 12 designates the position where the image to be combined is combined using the combining position designating function as well as displays the image to be combined transferred thereto on the monitor 20 or displays the image to be combined thereon as a print image in which it is combined with the photographed image. When the displayed images are proper, the camera 12 transfers the print image to, for example, the information processing unit 14 and supplies it to a printer or the like therefrom. Otherwise, the user stores the print image in the storing medium as an image file and requests the photo-lab to create a print therefrom.

Note that when input data (image to be combined) remains in the information processing unit 14 at the time, only the image photographed by the camera 12 may be transferred to the information processing unit 14 and combined with the image to be combined as a print image.

The following converting pattern instructions are exemplified as the above-mentioned converting pattern indication information.

When the input data is a photographed image (including moving image), a converting pattern instruction for converting the input data into the image data of an image (binary image indexed) corresponding to an image to be combined is exemplified.

When the input data is an image of a photographed document such as a time table, a converting pattern instruction for converting the input data into the image data of a document corresponding to an image to be combined is exemplified. Further, in this case, the input data may be converted into voice data.

When the input data is voice, a converting pattern instruction for converting the input data into the image data of a character and an image (photographed image, background image, various types of a character, and the like) corresponding to an image to be combined by recognizing the voice by a known method is exemplified.

When the input data is input through the operation of keys or buttons, a converting pattern instruction for converting the input data into the image data of a character, an image, and the like corresponding to an image to be combined is exemplified.

Further, when the input data is a character written by a hand, a converting pattern instruction for recognizing the character by a known method when necessary and for converting the input data into the image data of a character, an image and the like corresponding to an image to be combined is exemplified.

Further, templates for image combination that is provided by the photo-lab or the like may be supplied to the camera 12 using the information processing unit 14, the communication unit 16 and the like in place of the input data, displayed on the monitor 20 and selected thereon and the image data of the selected template may be obtained by the camera 12.

As apparent from the above description, according to the embodiment, various types of messages, images and the like can be easily combined with a print, and further the finished state of the print can be promptly and easily confirmed.

In the above processing, exemplified as an example of the method for converting the input data into the character and the image is a method of registering/storing image data (a photographed image, a background image, a character, a template, various types of marks, and the like), character data (an autograph signature, various types of comments, a sentence such as a poem, haiku (Japanese poem) and the like), and the designated regions of the image data and the character data in the information processing unit 14, the external unit 22 connected to the camera 12, and the like in connection with a reference word acting as the image data (for example, a character, a voice, and a keyword input through keys and buttons) and with indication buttons (keys) and the like. Further, a film ID number, a film frame number, image data (file) name, a name of a file describing a character pattern, limited area information (a shape, a center coordinate, a coordinate of a contour image, and the like) may be registered in place of data itself.

Further, groups of the image data of images to be combined that correspond to input data may be set and a corresponding group of image data may be read out in accordance with the input data. For example, input data of a person's name "Betty" and an image of "Betty" that was processed in the past may be registered in correspondence to each other, and when "Betty" is input by voice, the image of "Betty" may be read out and transferred to the camera 12.

Further, the content of image processing and reference words, instruction buttons and the like that are inherent to the user of the camera 12 may be registered in correspondence to each other and a print on which a photographed image finished as desired by the user is reproduced may be output by inputting an instruction for image processing similarly to the above-mentioned input data.

At the time, various types of processing parameters such as a range to which the processing is applied, the intensity of the processing, and the like may be included in the content of the image processing.

As a different embodiment, according to the photographing system 10 of the present invention, the user (photographer) also can find his or her position with pinpoint accuracy making use of an image photographed by the camera 12 and simple photographing position information without using a GPS (global positioning system) and the like.

The user of the camera 12 photographs an image, inputs the information of a rough position where the image is photographed (the name of a street, the name of a town, a house number, and the like) to the camera 12 through the external unit 22 and the mobile telephone 24 and transfers the information to the information processing unit 14 together with the photographed image through the communication unit 16.

A position information service provided by PHS (personal handyphone system) may be utilized to find the position information. Further, information as to a photographing direction may be included in the position information. Furthermore, position detecting accuracy can be improved by photographing a plurality of images in different directions at the same position.

In the embodiment, since the information processing unit 14 includes map information (which may include information of buildings and mountains as to the height and the like thereof), it detects a plurality of anticipated camera positions using the photographed image and the position information transferred thereto, creates images in virtual scopes at respective positions by simulation and subjects the images to the pattern matching with the photographed image.

As a result of the pattern matching, the information processing unit 14 lists up positions the degrees of matching of which exceed a predetermined value as candidate photographing positions and transfers the data of the candidate photographing positions or the image data of the maps thereof to the camera 12.

The user can detect his or her position by displaying the data of the candidate photographing positions or the image data of the maps thereof on the monitor 20 of the camera 12.

Further, when the camera 12 is a video camera, a multistage-focused image may be used.

That is, the user transfers a multistage-focused image and a position information to the information processing unit 14 in the same way. The information processing unit 14 detects anticipated camera positions, creates the camera to subject data of virtual scopes at the respective camera positions, and subjects the camera to subject data of the virtual scopes to the pattern matching with the camera to subject data determined from the photographed image (multistage-focused image) similarly to the above. Subsequently, positions the degrees of matching of which exceed a predetermined value are listed up as candidate photographing positions, the data of the candidate photographing positions is transferred to the camera 12 and displayed on the monitor 20, whereby the user confirms a photographing position.

Note that, in the method, when the camera 12 has a function for measuring distances at a plurality of points, the data of measured distances may be used directly in place of determining the camera to subject data from the multistage-focused image.

Further, in the photographing system 10 of the present invention, various types of processing in other embodiments than those described above, for example, various types of processing described in the commonly assigned Unexamined Published Japanese Patent Application No. (JP-A) 2000-

66312, JP-A 2000-105431, JP-A 2000-115686 and JP-A 2000-76427, and in the specification of commonly assigned Japanese Patent Applications No. 11-200572 and No. 11-306600 can be performed through a network and the like.

For example, when the processing disclosed in JP-A 2000-66312 is performed, the photographed image data and the date-and-time information or the position information are transferred from the camera 12 to the information processing unit 14, where the subject-related information and the like is elicited and transferred back to the camera 12. Preferably, on this occasion, the camera user makes the information eclectic and sets the eclectic information as additional information to be added to the image.

When the processing disclosed in JP-A 2000-105431 and JP-A 2000-115686 is performed, the processing may be performed in a state in which the information processing between the camera and the cartridge IC is replaced by that between the camera 12 and the information processing unit 14. For example, designation information of a specified area of the photographed image and retrieval indication information are transmitted from the camera 12 to the information processing unit 14, where a subject judgement and an elicitation of a subject-related information are performed by pattern matching and the like utilizing an encyclopedia database stored in the database 28 and, then, the resultant judgement and the thus elicited information may be sent back to the camera 12.

When the processing disclosed in JP-A 2000-76427 is performed, designation of an eye region is performed by the camera 12 and the resultant designation information and the image (data) of interest are transferred to the information processing unit 14, where red-eye correction processing is performed and, thereafter, the resultant corrected image (data) is sent back to the camera 12, where the sent-back image (data) is recorded in the image recording medium 19 and thereafter supplied to the photoprinter for outputting as a print.

When the processing described in the specification of Japanese Patent Application No. 11-200572 is performed, a hand-drawn rough contour illustration is inputted by the camera 12 and transferred therefrom to the information processing unit 14, where a matching retrieval is performed using shape data of the database 28 and, then, any hit retrieval image is sent back to the camera 12.

On this occasion, the photographed image data may be transferred and image retrieval processing may be performed by a known matching technique using density/color tint.

Furthermore, when the processing disclosed in the specification of Japanese Patent Application No. 11-306600 is performed, it is also possible to control the image processing content or return the event information or the like derived from the database 28 to the camera 12 in accordance with the subject or photographing condition.

The user interface program (e.g., GUI:graphic user interface) for use in inputting the additional information relating to each image processing or the indication information may be transferred from the side of the information processing unit 14 to the side of the camera 12.

In the photographing system 10 of the present invention arranged as described above, the above-mentioned various types of processing need not necessarily be carried out by transferring information from the camera 12 to the information processing unit 14. That is, it maybe determined, for example, that whether or not a designated processing can be executed by the external unit 22 such as the personal computer and the like connected to the camera 12, and when it is possible, the processing may be executed by the external unit 22.

For example, management data showing the content of processing is stored in both of the camera 12 and the external unit 22, it is checked whether or not a function for executing designated processing is mounted on the external unit 22 using the management data. When the function is mounted on the external unit 22, the designated processing is executed by the external unit 22, whereas when the function is not mounted on the external unit 22 and it is difficult to execute the designated processing, the processing is executed by transferring necessary information to the information processing unit 14 through the communication unit 16.

Usually, since processing executed by the information processing unit 14 of a photo-lab and the like requires a fee and a communication cost, a low priority is given to the processing executed at the photo-lab and the like, and when a function for executing designated processing is mounted on the external unit 22, it is preferable to preferentially select the execution of the processing in the external unit 22.

However, there are cases that even if the function is mounted on the external unit 22, the external unit 22 takes a very long calculation time based on the content of processing, that a communication cost is discounted based on the content of a communication contract, and that processing is preferably executed by the information processing unit 14 from the view point of processing accuracy and the like. Therefore, the user may select any one of the external unit 22 and the information processing unit 14 for the execution of processing, may assign priorities to the respective contents of processing, may manually change the priorities or may use these methods in combination.

Further, the user may select one of a plurality of processors (information processing units) based on the contents of processing.

While the image processing method, the image processing apparatus, the camera and the photographing system of the present invention has been described above in detail, the present invention is by no means limited to the above-described embodiments and it goes without saying that various improvements and modifications can be made within the range which does not depart from the gist of the present invention.

As described above in detail, according to the image processing method, the image processing apparatus, the camera and the photographing system of the present invention, the function and capability of the camera are greatly improved, and various types of processing such as AF and AE in consideration of a principal subject, the correction of an image, the combination of images, the detection of the position of a photographer, and the like, which have been impossible in conventional cameras, can be carried out simply and promptly.

What is claimed is:

1. A photographing system comprising:
   a camera; and
   an image processing apparatus; wherein
   said camera comprises:
      an image sensor for obtaining photographed image data;
      an input unit for inputting rough photographing position information; and
      an information sending/receiving unit for sending said photographed image data which has been obtained, and said rough photographing position information which has been inputted on said input unit to said image processing apparatus, as well as, receives photographing position information which has been obtained by said image processing apparatus in accordance with said rough photographing position information from said image processing apparatus; and wherein said image processing apparatus comprises:
- a receiving/supplying unit which receives said photographed image data and said rough photographing position information from said camera; and
- an information processing unit which detects anticipated photographing positions using received said photographed image data and said rough photographing position information as well as map information stored therein, creates images in virtual scope at detected positions from said map information by simulation, subjects said images in virtual scope to pattern matching with said photographed image, and decides a position which degrees of matching exceed a predetermined value as candidate photographing positions to obtain photographing position information being more accurate than said rough photographing position information, and supplies said photographing position information to said camera through said receiving/supplying unit.

2. The photographing system according to claim 1, wherein said rough photographing position information includes at least one of a name of a street, a name of a town, and a house number.

3. The photographing system according to claim 1, wherein said input unit gets said rough photographing position information using a position information service by a personal handy-phone system.

4. The photographing system according to claim 1, wherein said image processing apparatus supplies image data of maps of photographing position corresponding to said photographing position information as said photographing position information.

5. The photographing system according to claim 1, wherein said rough photographing position information includes photographing direction information.

6. The photographing system according to claim 1, wherein said camera sends image data of images photographed in different directions at a same point to said image processing apparatus, and said image processing apparatus obtains said photographing position information using the image data of images photographed in different directions.

7. The photographing system according to claim 1, wherein said camera sends image data of images of same scene photographed in multistage-focus to said image processing apparatus, and said image processing apparatus determines camera-to-subject data from said images photographed in multistage-focus and creates camera-to-subject data of said virtual scope at said anticipated photographing positions, and subjects said camera-to-subject data of said photographed images to pattern matching with said camera-to-subject data of said virtual scope to obtains said photographing position information.

8. The photographing system according to claim 1, comprising a plurality of said image processing apparatuses, wherein said camera selects one image processing apparatus among said plurality of image processing apparatuses based on whether the apparatus has functions for information processing of creating images in virtual scope and obtaining said photographing position information by the pattern matching, and sends said photographed image data and said rough photographing position information to the selected image processing apparatus.

* * * * *